US011942235B2

(12) United States Patent
Stevens

(10) Patent No.: US 11,942,235 B2
(45) Date of Patent: Mar. 26, 2024

(54) HYBRID CABLE FOR DISTRIBUTED POWER CONNECTIVITY

(71) Applicant: CommScope Technologies LLC, Hickory, NC (US)

(72) Inventor: Randall Stevens, Lincolnton, NC (US)

(73) Assignee: CommScope Technologies LLC, Hickory, NC (US)

(*) Notice: Subject to any disclaimer, the term of this patent is extended or adjusted under 35 U.S.C. 154(b) by 2 days.

(21) Appl. No.: 17/691,852

(22) Filed: Mar. 10, 2022

(65) Prior Publication Data
US 2022/0199293 A1 Jun. 23, 2022

Related U.S. Application Data

(63) Continuation of application No. PCT/US2020/048963, filed on Sep. 1, 2020.
(Continued)

(51) Int. Cl.
*H01B 11/22* (2006.01)
*G02B 6/44* (2006.01)
(Continued)

(52) U.S. Cl.
CPC ......... *H01B 11/22* (2013.01); *G02B 6/44384* (2023.05); *G02B 6/566* (2023.05); *H01B 7/2825* (2013.01)

(58) Field of Classification Search
None
See application file for complete search history.

(56) References Cited

U.S. PATENT DOCUMENTS

| 6,049,647 A | 4/2000 | Register et al. |
| 10,388,430 B1* | 8/2019 | Evans .................. H01B 7/0275 |

(Continued)

FOREIGN PATENT DOCUMENTS

| CN | 203070816 U | 7/2013 |
| EP | 1290482 B1 | 2/2017 |
| WO | WO2011/046737 | 6/2001 |

OTHER PUBLICATIONS

COMMSCOPE, Hellax FiberFeed Hybrid Cable, HTC-4SM-412-APV Specification Sheet, Jun. 10, 2014.

*Primary Examiner* — Chad H Smith
(74) *Attorney, Agent, or Firm* — Muncy, Geissler, Olds & Lowe, P.C.

(57) ABSTRACT

A hybrid cable includes a central strength member, residing in a center of the cable. At least two insulated conductors are abutting the central strength member. One or more buffer tubes are included in the cable, each with at least one optical fiber. One or more filler rods are optionally included in the cable. A shielding layer and jacket surround the elements. In one embodiment, four large insulated conductors and two filler rods abut the central strength member. A first water-blocking tape surrounds the four large insulated conductors, filler rods and central strength member to form an inner core. A concentric core surrounds the central core. The concentric core includes two insulated conductors, plural buffer tubes and a second water-blocking tape surrounding the two insulated conductors and the plural buffer tubes. The shielding layer surrounds the concentric core, and the jacket surrounds the shielding layer. A toning signal carrying medium may also exist outside of the shielding layer.

20 Claims, 13 Drawing Sheets

Related U.S. Application Data

(60) Provisional application No. 62/900,408, filed on Sep. 13, 2019.

(51) Int. Cl.
  *G02B 6/46* (2006.01)
  *H01B 7/282* (2006.01)

(56) References Cited

U.S. PATENT DOCUMENTS

2011/0311191 A1 12/2011 Hayashishita et al.
2013/0287348 A1 10/2013 Register, III et al.

\* cited by examiner

HYBRID CABLE FOR DISTRIBUTED POWER CONNECTIVITY

This application is a continuation of International Application No. PCT/US2020/048963, filed Sep. 1, 2020, which claims the benefit of U.S. Provisional Application No. 62/900,408, filed Sep. 13, 2019, both of which are herein incorporated by reference.

BACKGROUND OF THE INVENTION

1. Field of the Invention

The present invention relates to a hybrid cable for both power and communication transmission. More particularly, the present invention relates to a hybrid cable possessing multiple power conductors and plural buffer tubes with multiple optical fibers in each buffer tube.

2. Description of the Related Art

Electronic devices for facilitating data, video and/or voice communications are often located in outside environments. For example, cellular systems, wifi systems, security systems and/or other networked devices are often mounted to power poles, street lights, buildings and/or cell towers. Such devices need to have access to both a power source and a central communications server. Many electronic devices are currently using optical fibers to transmit and receive communication signals with the central communications server.

When connecting power and communication channels to the electronic device, it is often required that the cabling extend up towers, poles, building walls, etc. Many operators are installing a fiber optic cable up to the electronic device and also installing a power cable up to the same electronic device. Installation costs and tower rent agreements are often based upon a per-cable charge or a per-foot of cable charge. Therefore, the use of a hybrid cable, which possesses both power conductors and optical fibers is known and desired in the art to reduce the installation costs, and any rent cost once the cable is installed. Similar per-foot and/or per-cable charges are common with the underground installation of cables, e.g., cables used in a direct burial or within an underground conduit.

SUMMARY OF THE INVENTION

The Applicant has appreciated a new internal geometry and layout of components of a hybrid cable, which improves the roundness of the cable and hence improves the storage, transportation and the installation costs and procedures.

The Applicant has also appreciated a hybrid cable design which is well suited to feed multiple electronic devices in a daisy-chain fashion. By the present design, the power needs of multiple electronic devices, e.g., five, seven, ten or more electronic devices, may be served in serial fashion by the power carried by the larger power conductors, e.g., twelve American Wire Gauge (AWG) conductors, of the hybrid cable. Also, the hybrid cable includes numerous optical fibers, e.g., up to 144 optic fibers in up to twelve buffer tubes, to serve the communication needs of the multiple electronic devices.

The Applicant has also appreciated that damage may occur to a hybrid cable, which extends over such a long distance to serve the needs of multiple electronic devices. The hybrid cable might extend up seven or more towers or poles and be buried underground between such towers and poles, either by direct burial or within a conduit. Hence, the hybrid cable would be exposed to many factors which could damage it. To this end two additional, smaller gauge conductors, e.g., eighteen AWG conductors, may be integrated into the core of the cable and be utilized by detection circuitry to alert the central communications server if the hybrid cable has been damaged. The central server can exercise alerts or device controls whenever the smaller gauge conductors indicate damage. In one embodiment, the smaller gauge conductors are placed in a concentric core which encircles a central core, possessing the larger conductors. Hence, the smaller gauge conductors are more likely to be damaged prior to damage to the larger conductors.

One or more of the drawbacks of the background art and the objectives of the present invention are addressed by a hybrid cable which includes a central strength member, residing in a center of the cable. At least two insulated conductors are abutting the central strength member. One or more buffer tubes are included in the cable, each with at least one optical fiber. One or more filler rods are optionally included in the cable. A shielding layer and jacket surround the elements. In one embodiment, four large insulated conductors and two filler rods abut the central strength member. A first water-blocking tape surrounds the four large insulated conductors, filler rods and central strength member to form an inner core. A concentric core surrounds the central core. The concentric core includes two insulated conductors, plural buffer tubes and a second water-blocking tape surrounding the two insulated conductors and the plural buffer tubes. The shielding layer surrounds the concentric core, and the jacket surrounds the shielding layer. A toning signal carrying medium may also exist outside of the shielding layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
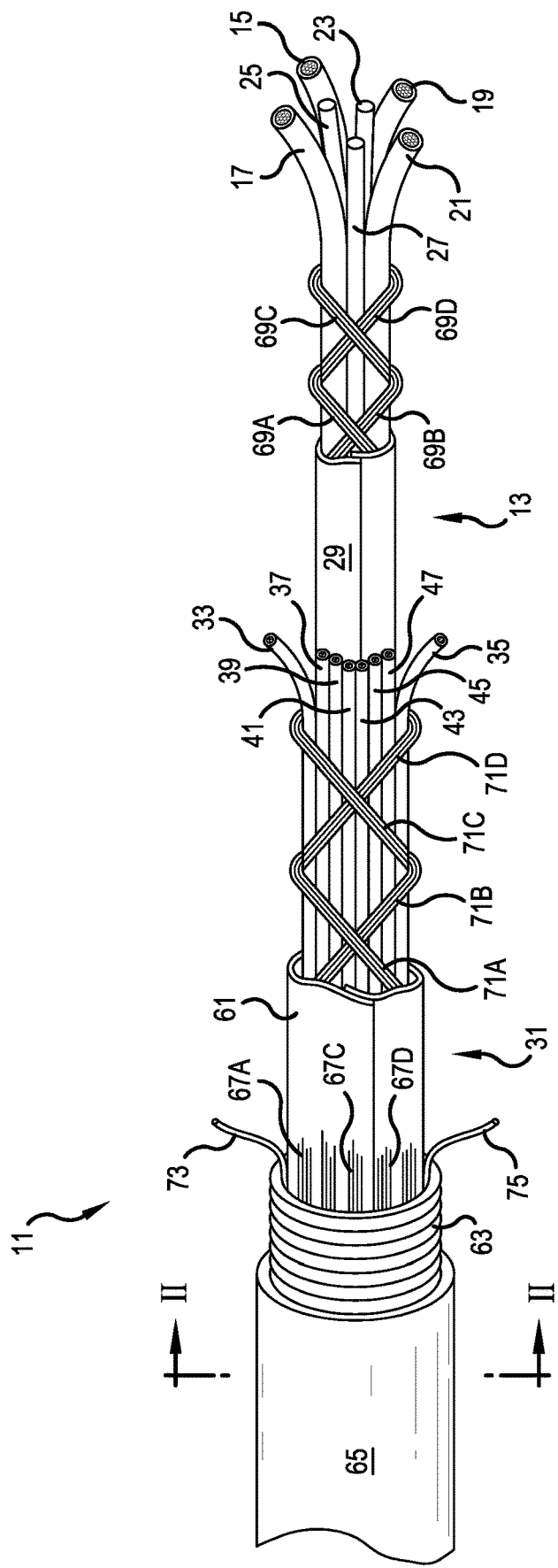
FIG. 1 is a front perspective view of a hybrid cable in accordance with a first embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
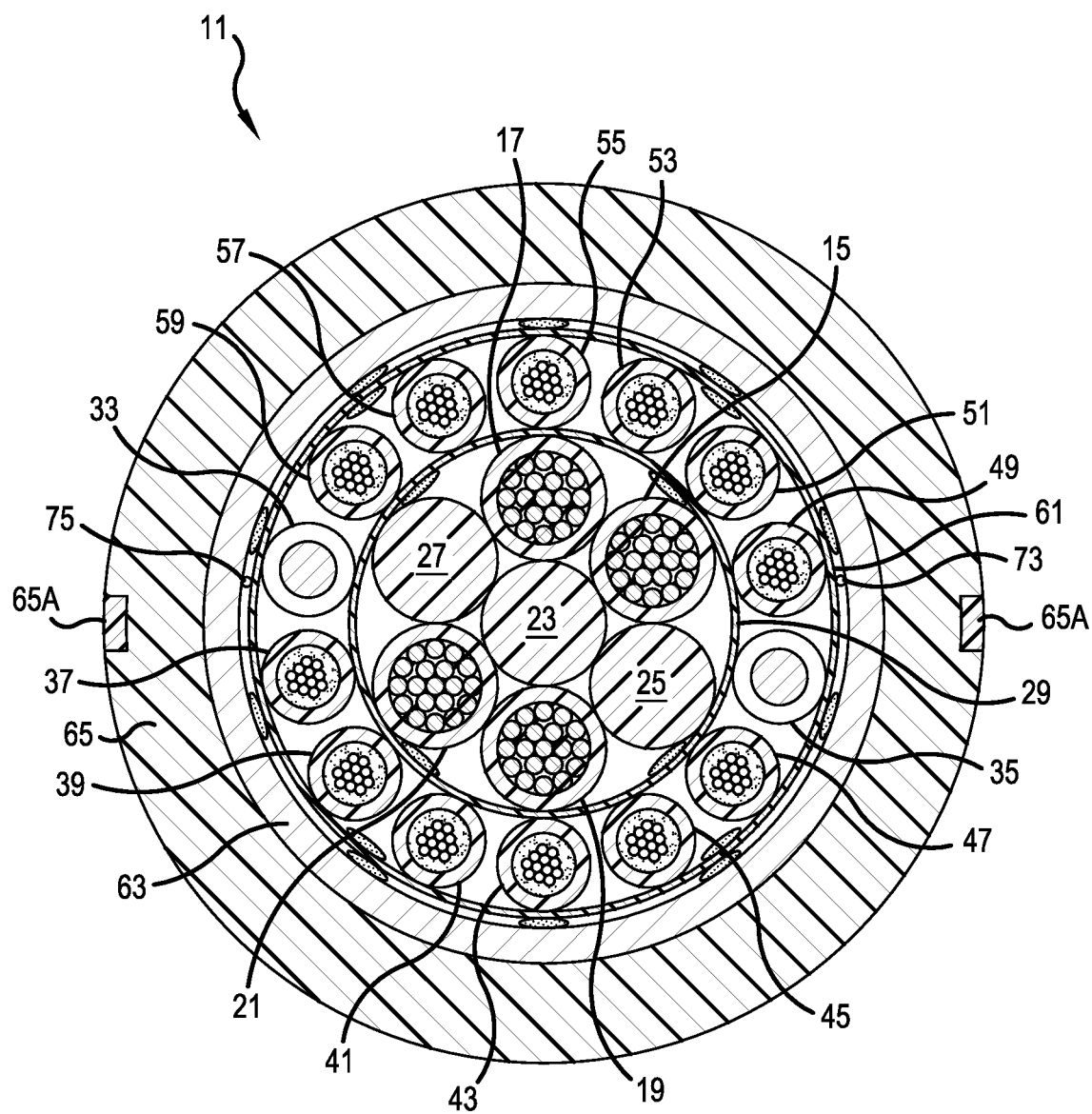
FIG. 2 is a cross sectional view taken along line II-II in FIG. 1.

FIG. 1 is a front perspective view of a hybrid cable 11 in accordance with a first embodiment of the present invention. FIG. 2 is a cross sectional view taken along line II-II in FIG. 1. The hybrid cable 11 includes an inner core 13. The inner core 13 includes four large insulated conductors 15, 17, 19 and 21. A central strength member 23 resides in a center of the inner core 13. The central strength member 23 is flanked by a plurality of first filler rods, e.g., on two sides by first filler rods 25 and 27. A first water-blocking tape 29 surrounds the four large insulated conductors 15, 17, 19 and 21, the central strength member 23 and the plurality of first filler rods 25 and 27 to form the inner core 13.

In a preferred embodiment, the four large insulated conductors 15, 17, 19 and 21 are each formed by a twelve American Wire Gauge (AWG) conductor, such as a stranded copper wire, which is in turn surrounded by a dielectric insulation layer. The four large insulated conductors 15, 17, 19 and 21 are each in abutment with the central strength member 23. The central strength member 23 may be formed as a glass reinforced plastic (GRP) rod. The first filler rods 25 and 27 may be formed of a dielectric plastic. The central strength member 23, due to its embedded fiberglass segments, provides a high degree of strength to the hybrid cable 11. The first filler rods 25 and 27 do not provide much added strength to the hybrid cable 11 but primarily assist in keeping the overall outer cross sectional shape of the hybrid cable 11 circular, so that the cable can be stored and transported on a reel and deployed in the field more easily.

A concentric core 31 surrounds the central core 13. The concentric core 31 includes two small insulated conductors 33 and 35. In a preferred embodiment, the two small insulated conductors 33 and 35 are each formed by an eighteen AWG conductor, such as a stranded copper wire, which is in turn surrounded by a dielectric layer.

The concentric core 31 also includes a plurality of buffer tubes 37, 39, 41, 43, 45, 47, 49, 51, 53, 55, 57 and 59, formed in a circle with the two small insulated conductors 33 and 35 to surround the central core 13. Each buffer tube 37, 39, 41, 43, 45, 47, 49, 51, 53, 55, 57 and 59 includes at least one optical fiber, such as four, six, eight, ten or twelve optical fibers, preferably surrounded by a gel, such as a water blocking gel, within the buffer tube. FIGS. 1-2 illustrate twelve optical fibers loosely contained within each of the twelve buffer tubes, making a total of 144 optical fibers in the hybrid cable 11. However, it would be possible to replace one or more of the buffer tubes 37, 39, 41, 43, 45, 47, 49, 51, 53, 55, 57 and 59 with a filler rod, such as a dielectric member of a same diameter as the replaced buffer tube, to reduce the fiber count of the hybrid cable 11. For example, the hybrid cable 11 may include only eleven buffer tubes 37, 39, 41, 43, 45, 47, 49, 51, 53, 55 and 57, each with twelve optical fibers, making a fiber count of the hybrid cable 11 one hundred thirty two fibers.

A second water-blocking tape 61 surrounds the two small insulated conductors 33 and 35 and the plurality of buffer tubes 37, 39, 41, 43, 45, 47, 49, 51, 53, 55, 57 and 59 to form the concentric core 31. A shielding layer 63 surrounds the concentric core 31. In the illustrated embodiments of the present application, the shielding layer 31 is formed by corrugated aluminum. However, other materials may be used to form the shielding layer 31.

A jacket 65 surrounds the shielding layer 63. The jacket 65 may include one or more stripes 65A of a contrasting color, to help identify the cable. For example, the majority of the jacket 65 may be black and the one or more stripes 65A may be red. A first plurality of textile strength elements 67 is located between the second water-blocking tape 61 and the shielding layer 63. In one embodiment, the first plurality of textile strength elements 67 includes ten bundles of fibers, e.g., 67A—67J, each of which extends longitudinally along the length of the hybrid cable 11.

A second plurality of textile strength elements 69 is located between the first water-blocking tape 29 and the four large insulated conductors 15, 17, 19 and 21, the central strength member 23 and the plurality of first filler rods 25 and 27. In the embodiment of FIGS. 1 and 2, the second plurality of textile strength elements 69 includes a first grouping 69A and a third grouping 69C of textile strength elements helically wrapped around the four large insulated conductors 15, 17, 19 and 21, the central strength member 23 and the plurality of first filler rods 25 and 27 in a first wrapping direction. The second plurality of textile strength elements 69 also includes a second grouping 69B and a fourth grouping 69D of textile strength elements helically wrapped around the four large insulated conductors 15, 17, 19 and 21, the central strength member 23 and the plurality of first filler rods 25 and 27 in a second wrapping direction, opposite to the first wrapping direction.

The first and third groupings 69A and 69C of textile strength elements cross over the second and fourth groupings 69B and 69D of textile strength elements to hold the four large insulated conductors 15, 17, 19 and 21, the central strength member 23 and the plurality of first filler rods 25 and 27 together during assembly of the hybrid cable 11, so that the first water-blocking tape 29 may be wrapped there around to form the central core 13.

A third plurality of textile strength elements 71 is located between the second water-blocking tape 61 and the two small insulated conductors 33 and 35 and the plurality of buffer tubes 37, 39, 41, 43, 45, 47, 49, 51, 53, 55, 57 and 59. In the embodiment of FIGS. 1 and 2, the third plurality of textile strength elements 71 includes a fifth grouping 71A and a seventh grouping 71C of textile strength elements helically wrapped around the two small insulated conductors 33 and 35 and the plurality of buffer tubes 37, 39, 41, 43, 45, 47, 49, 51, 53, 55, 57 and 59 in a first wrapping direction. The third plurality of textile strength elements 71 also includes a sixth grouping 71B and an eighth grouping 71D of textile strength elements helically wrapped around the two small insulated conductors 33 and 35 and the plurality of buffer tubes 37, 39, 41, 43, 45, 47, 49, 51, 53, 55, 57 and 59 in a second wrapping direction, opposite to the first wrapping direction.

The fifth and seventh groupings 71A and 71C of textile strength elements cross over the sixth and eighth groupings 71B and 71D of textile strength elements to hold the two small insulated conductors 33 and 35 and the plurality of buffer tubes 37, 39, 41, 43, 45, 47, 49, 51, 53, 55, 57 and 59 together during assembly of the cable, so that the second water-blocking tape 61 may be wrapped there around to form the concentric core 31.

In a preferred embodiment, the first, second and third pluralities of textile strength elements 67, 69 and 71 are formed of flaccid threads, like aramid fibers, sold under the trademark KELVAR. In a preferred embodiment, the hybrid cable 11 may also include first and second ripcords 73 and 75 located between the second water-blocking tape 61 and the shielding layer 63. The first and second ripcords 73 and 75 assist in opening up an end of the hybrid cable 11 for a termination to connectors and may also be formed of flaccid threads, like aramid threads, sold under the trademark KELVAR.

In the embodiment of FIGS. 1 and 2, the plurality of first filler rods 25 and 27 consists of two total filler rods. Each of the two total filler rods 25 and 27 is approximately equal in diameter to the central strength member 23 and also approximately equal in diameter to one of the four larger insulated conductors 15, 17, 19 and 21. Also, each of the two total filler rods 25 and 27 is in abutment with the central strength member 23.

Figure 3:
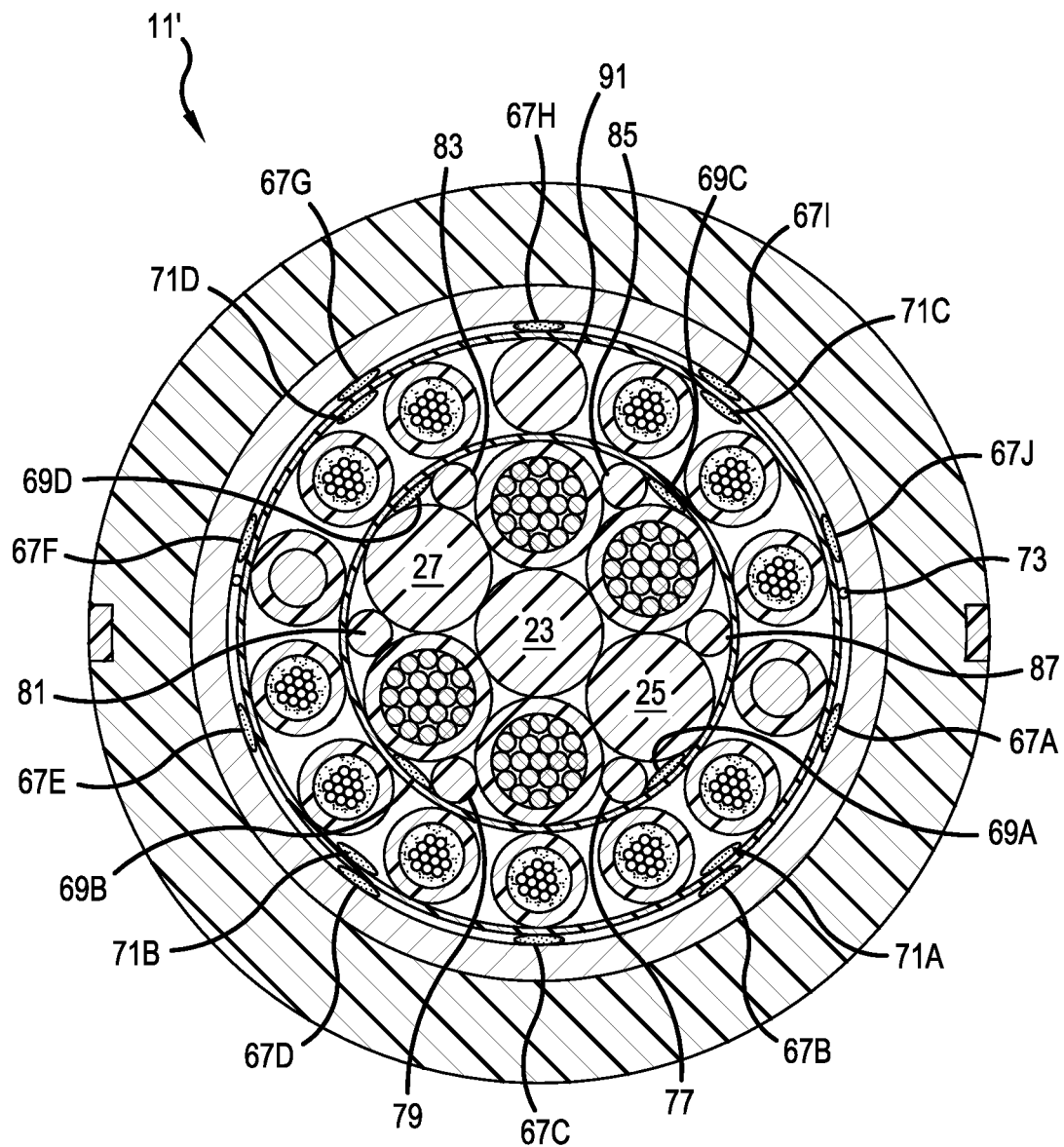
FIG. 3 is a cross sectional view, similar to FIG. 2, but illustrating alternative features for the hybrid cable of FIGS. 1 and 2.

FIG. 3 is a cross sectional view similar to FIG. 2 of a hybrid cable 11'. The hybrid cable 11' is an alternative to the hybrid cable 11. In FIG. 3, the plurality of first filler rods consists of eight total filler rods 25, 27, 77, 79, 81, 83, 85 and 87. The eight total first filler rods include the two larger filler rods 25 and 27, each in abutment with the central strength member 23, as described in conjunction with FIG. 2. Also, the eight total first filler rods include six smaller first filler rods 77, 79, 81, 83, 85 and 87, which are not in abutment with the central strength member 23, but which do abut the inside surface of the first water-blocking tape 29.

The six smaller first filler rods 77, 79, 81, 83, 85 and 87 cause the inner core 13 to assume a very circular outer profile, which would commonly be seen as necessary to accomplish a circular outer profile to the cross section of the overall hybrid cable 11'. However, surprisingly, the Applicant has discovered that if the six smaller first filler rods 77, 79, 81, 83, 85 and 87 are omitted, the outer profile of the cross section of the overall hybrid cable 11 can still be made circular. Therefore, the embodiment shown in FIGS. 1 and 2 is preferred over the alternative, depicted in FIG. 3, as the hybrid cable 11 remains circular in its outer profile while sparing the costs, added weight and assembly steps associated with the six smaller first filler rods 77, 79, 81, 83, 85 and 87.

FIG. 3 also illustrates the replacement of buffer tube 55 with a second filler rod 91, such as a dielectric member formed as a cylinder of a same diameter as the replaced buffer tube 55. The replacement reduces the fiber count of the hybrid cable 11'. The hybrid cable 11' includes only eleven buffer tubes 37, 39, 41, 43, 45, 47, 49, 51, 53, 57 and 59, each with twelve optical fibers, making a fiber count of the hybrid cable 11 one hundred thirty two fibers.

Figure 4:
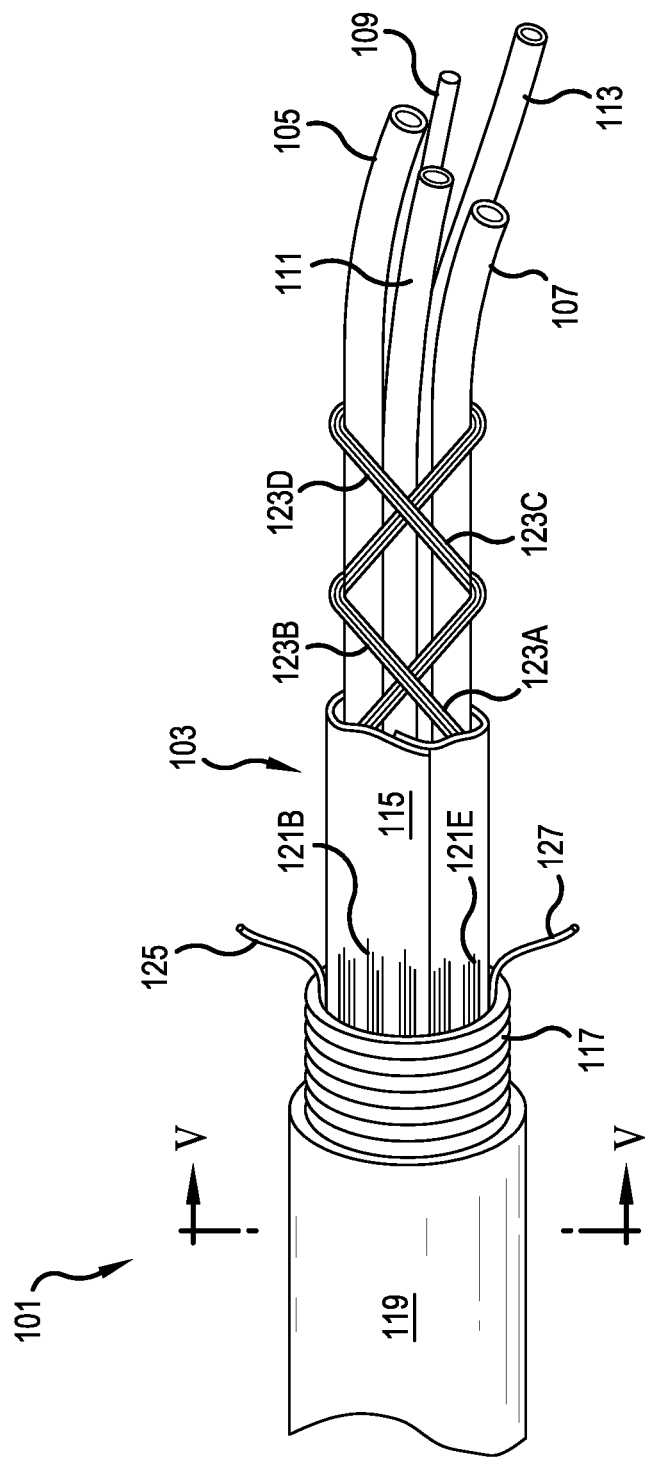
FIG. 4 is a front perspective view of a hybrid cable in accordance with a second embodiment of the present invention.
Figure 5:
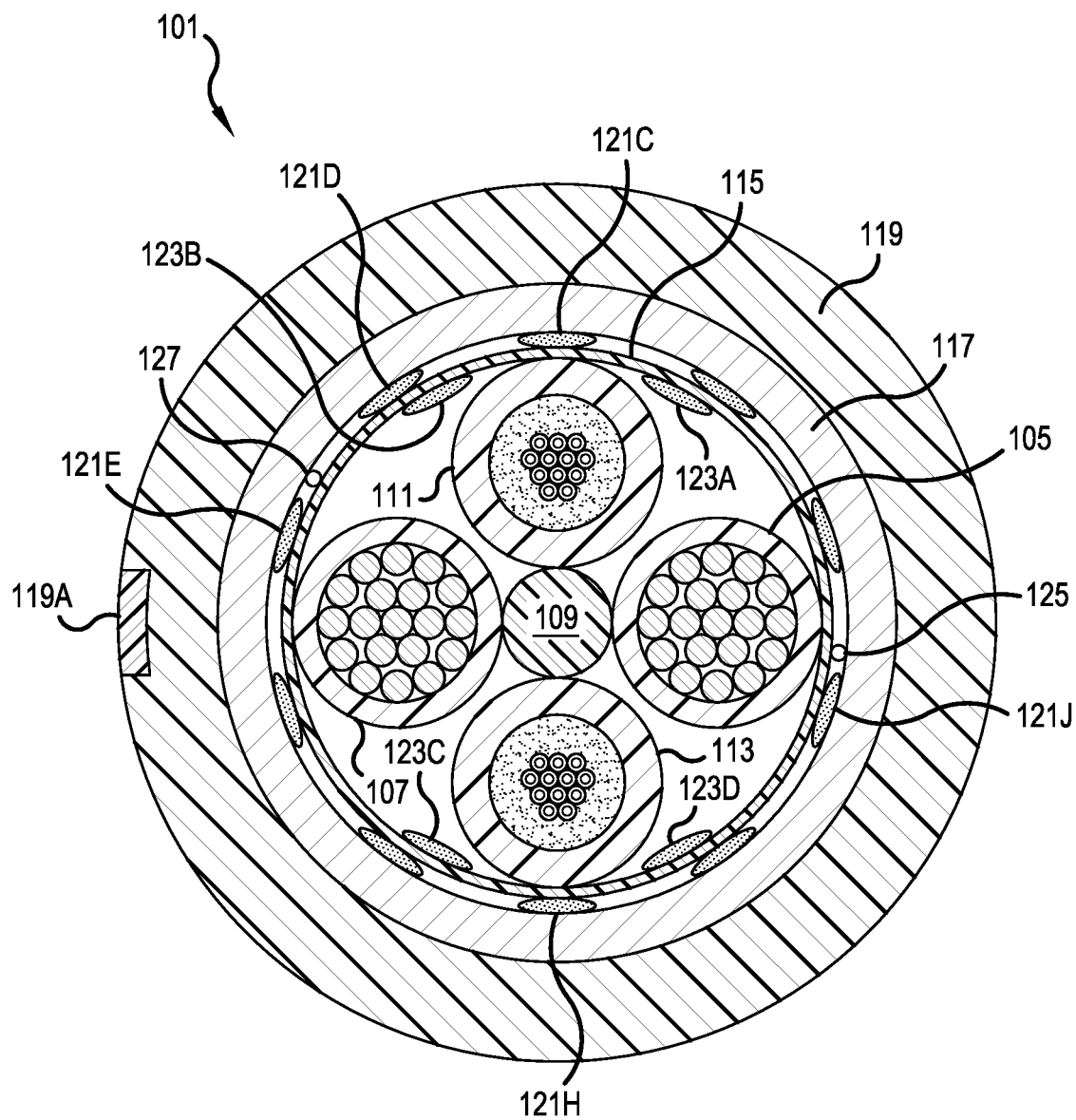
FIG. 5 is a cross sectional view taken along line V-V in FIG. 4.

FIG. 4 is a front perspective view of a hybrid cable 101 in accordance with a second embodiment of the present invention. FIG. 5 is a cross sectional view taken along line V-V in FIG. 4. The hybrid cable 101 includes a core 103 with two large insulated conductors 105 and 107.

A central strength member 109 resides in a center of the core 103. The central strength member 109 is flanked by first and second buffer tubes 111 and 113. Each of the first and second buffer tubes 111 and 113 includes at least one optical fiber, such as four, six, eight, ten or twelve optical fibers. FIGS. 4-5 illustrate twelve optical fibers loosely contained within a water blocking gel of each of the first and second buffer tubes 111 and 113, making a total of 24 optical fibers in the hybrid cable 101. A water-blocking tape 115 surrounds the two large insulated conductors 105 and 107, the central strength member 109 and the first and second buffer tubes 111 and 113 to form the core 103.

In a preferred embodiment, the two large insulated conductors 105 and 107 are each formed by a twelve AWG conductor, such as a stranded copper wire, which is in turn surrounded by a dielectric insulation layer. The central strength member 109 may be formed as a GRP rod.

A shielding layer 117 surrounds the core 103. In the illustrated embodiment, the shielding layer 117 is formed by corrugated aluminum. However, other materials may be used to form the shielding layer 117.

A jacket 119 surrounds the shielding layer 117. The jacket 119 may include one or more stripes 119A of a contrasting color, to help identify the cable. For example, the majority of the jacket 119 may be black and the one or more stripes 119A may be red. A first plurality of textile strength elements 121 is located between the water-blocking tape 115 and the shielding layer 117. In one embodiment, the first plurality of textile strength elements 121 includes ten bundles of fibers, e.g., 121A—121J, each of which extends longitudinally along the length of the hybrid cable 101.

A second plurality of textile strength elements 123 is located between the water-blocking tape 115 and the two large insulated conductors 105 and 107, the central strength member 109 and the first and second buffer tubes 111 and 113. In the embodiment of FIGS. 4 and 5, the second plurality of textile strength elements 123 includes a first grouping 123A and a third grouping 123C of textile strength elements helically wrapped around the two large insulated conductors 105 and 107, the central strength member 109 and the first and second buffer tubes 111 and 113 in a first wrapping direction. The second plurality of textile strength elements 123 also includes a second grouping 123B and a fourth grouping 123D of textile strength elements helically wrapped around the two large insulated conductors 105 and 107, the central strength member 109 and the first and second buffer tubes 111 and 113 in a second wrapping direction, opposite to the first wrapping direction.

The first and third groupings 123A and 123C of textile strength elements cross over the second and fourth groupings 123B and 123D of textile strength elements to hold the two large insulated conductors 105 and 107, the central strength member 109 and the first and second buffer tubes 111 and 113 together during assembly of the hybrid cable 101, so that the water-blocking tape 115 may be wrapped there around to form the core 103.

In a preferred embodiment, the first and second pluralities of textile strength elements 121 and 123 are formed of flaccid threads, like aramid fibers, sold under the trademark KELVAR. In a preferred embodiment, the hybrid cable 101 may also include first and second ripcords 125 and 127 located between the water-blocking tape 115 and the shielding layer 117. The first and second ripcords 125 and 127 assist in opening up an end of the hybrid cable 101 for a termination to connectors.

Figure 6:
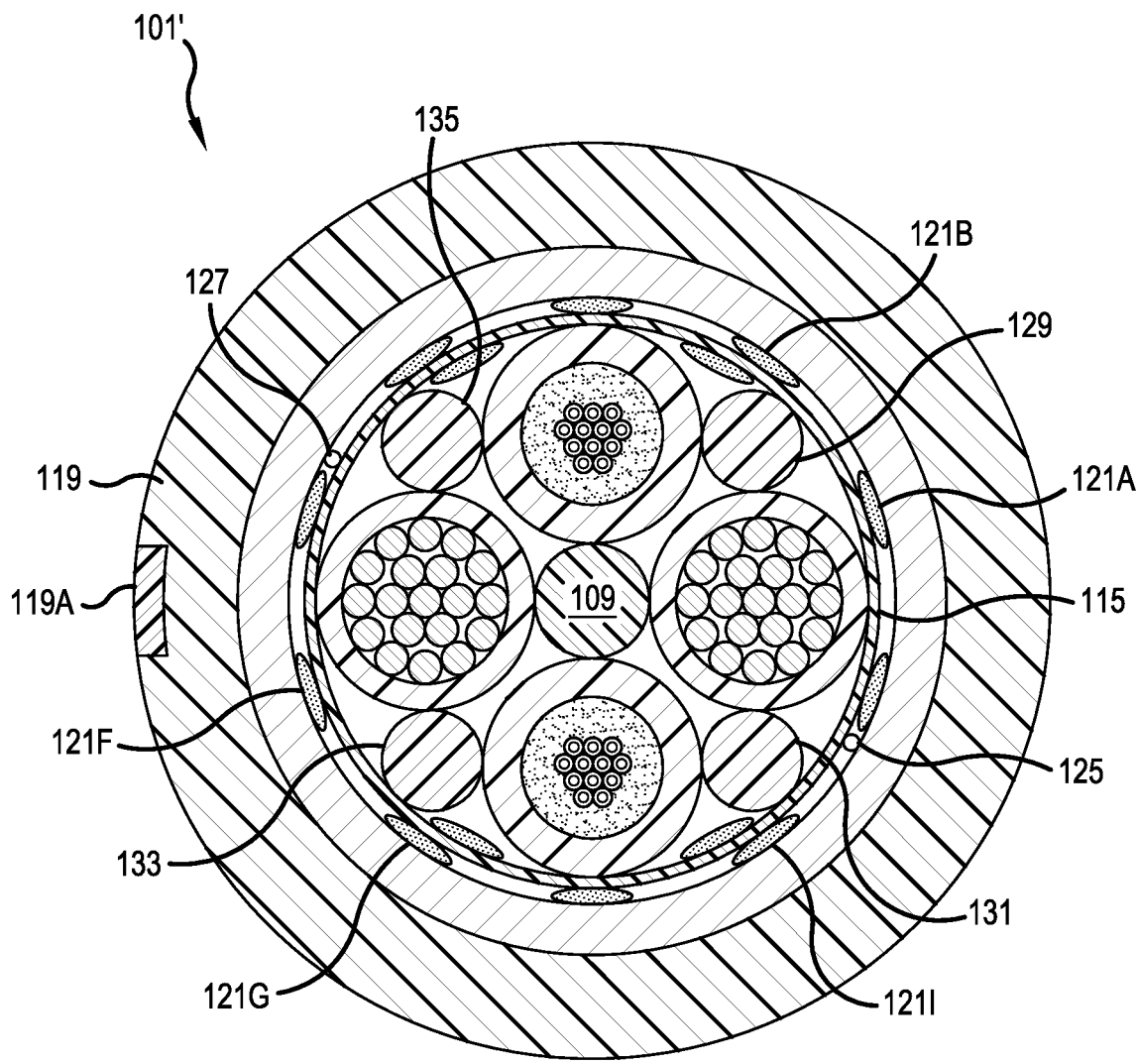
FIG. 6 is a cross sectional view, similar to FIG. 5, but illustrating alternative features for the hybrid cable of FIGS. 4 and 5.

In the embodiment of FIGS. 4 and 5, no filler rods are employed. FIG. 6 is a cross sectional view similar to FIG. 5 of a hybrid cable 101'. The hybrid cable 101' is an alternative to the hybrid cable 101. In FIG. 6, four filler rods 129, 131, 133 and 135 are added to the core 103. Each of the four filler rods 129, 131, 133 and 135 is not in abutment with the central strength member 109, but is in abutment with the inside surface of the water-blocking tape 115.

The four filler rods 129, 131, 133 and 135 cause the core 103 to assume a very circular outer profile, which would commonly be seen as necessary to accomplish a circular outer profile to the cross section of the overall hybrid cable 101'. However, surprisingly, the Applicant has discovered that if the four first filler rods 129, 131, 133 and 135 are omitted, the outer profile of the cross section of the overall hybrid cable 101 can still be made circular. Therefore, the embodiment shown in FIGS. 4 and 5 is preferred over the alternative, depicted in FIG. 6, as the hybrid cable 101 remains circular in its outer profile while sparing the costs, added weight and assembly steps associated with the four filler rods 129, 131, 133 and 135.

Figure 7:
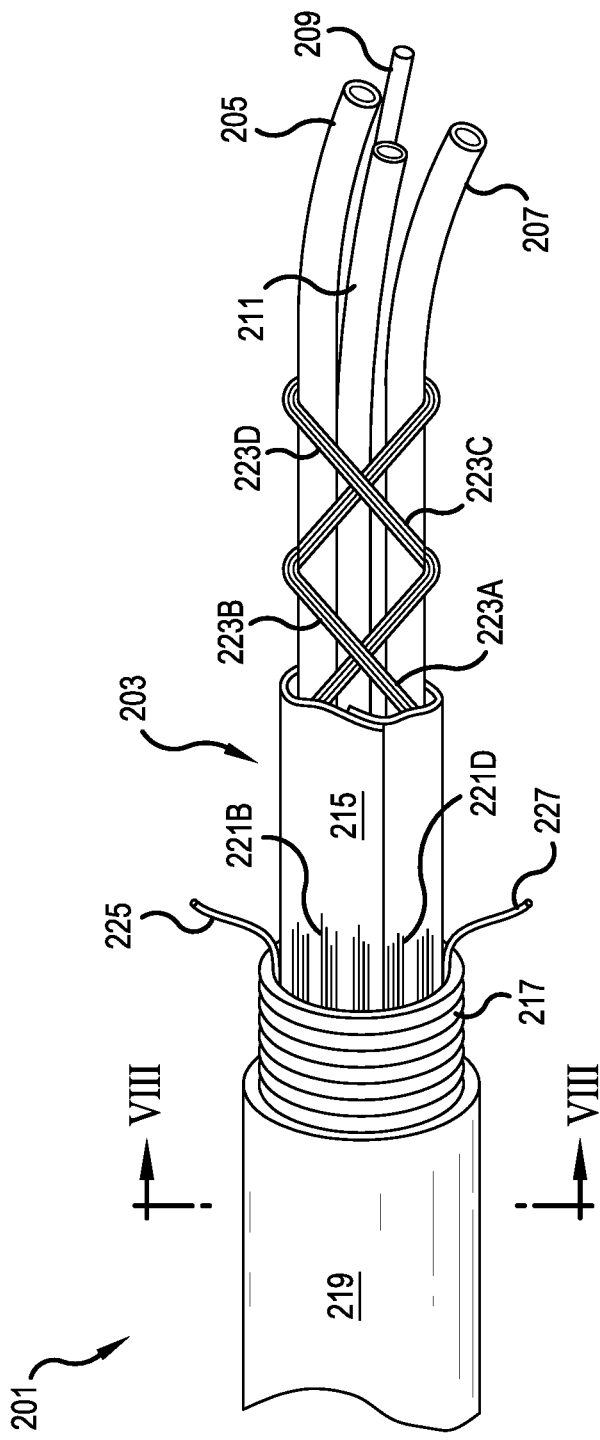
FIG. 7 is a front perspective view of a hybrid cable in accordance with a third embodiment of the present invention.
Figure 8:
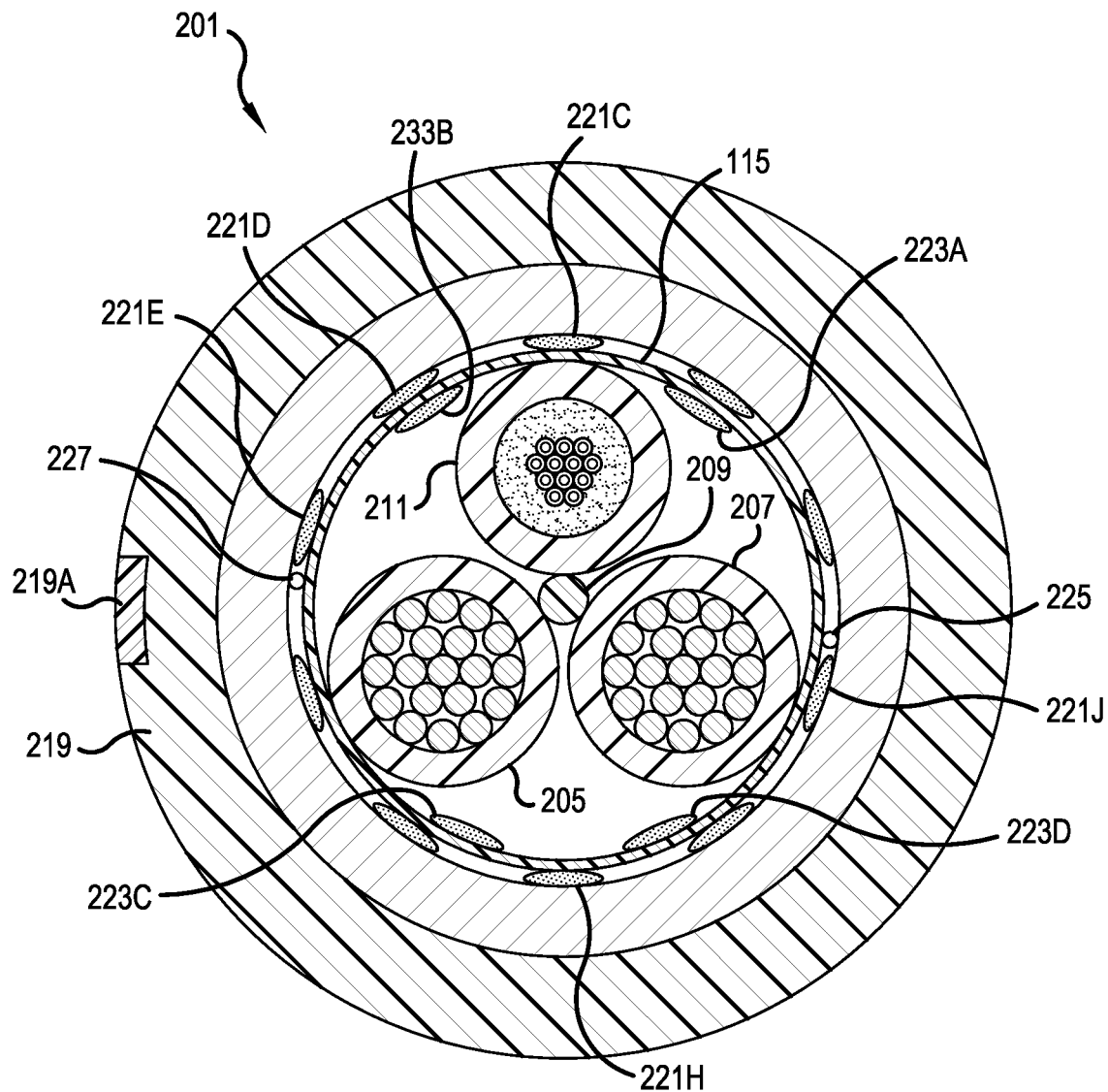
FIG. 8 is a cross sectional view taken along line VIII-VIII in FIG. 7.

FIG. 7 is a front perspective view of a hybrid cable 201 in accordance with a third embodiment of the present invention. FIG. 8 is a cross sectional view taken along line VIII-VIII in FIG. 7. The hybrid cable 201 includes a core 203 with two large insulated conductors 205 and 207.

A central strength member 209 resides in a center of the core 203. The central strength member 209 is flanked by a single buffer tube 211. The single buffer tube 211 includes at least one optical fiber, such as four, six, eight, ten or twelve optical fibers, preferably surrounded by a gel, such as a water blocking gel, within the buffer tube. FIGS. 7-8 illustrate twelve optical fibers loosely contained within the single buffer tube 211, making a total of 12 optical fibers in the hybrid cable 201. A water-blocking tape 215 surrounds the two large insulated conductors 205 and 207, the central strength member 209 and the single buffer tube 211 to form the core 203.

In a preferred embodiment, the two large insulated conductors 205 and 207 are each formed by a twelve AWG conductor, such as a stranded copper wire, which is in turn surrounded by a dielectric insulation layer. The central strength member 209 may be formed as a GRP rod.

A shielding layer 217 surrounds the core 203. In the illustrated embodiment, the shielding layer 217 is formed by corrugated aluminum. However, other materials may be used to form the shielding layer 217.

A jacket 219 surrounds the shielding layer 217. The jacket 219 may include one or more stripes 219A of a contrasting color, to help identify the cable. For example, the majority of the jacket 219 may be black and the one or more stripes 219A may be red. A first plurality of textile strength elements 221 is located between the water-blocking tape 215 and the shielding layer 217. In one embodiment, the first plurality of textile strength elements 221 includes ten bundles of fibers, e.g., 221A—221J, each of which extends longitudinally along the length of the hybrid cable 201.

A second plurality of textile strength elements 223 is located between the water-blocking tape 215 and the two large insulated conductors 205 and 207, the central strength member 209 and the single buffer tube 211. In the embodiment of FIGS. 7 and 8, the second plurality of textile strength elements 223 includes a first grouping 223A and a third grouping 223C of textile strength elements helically wrapped around the two large insulated conductors 205 and 207, the central strength member 209 and the single buffer tube 211 in a first wrapping direction. The second plurality of textile strength elements 223 also includes a second grouping 223B and a fourth grouping 223D of textile strength elements helically wrapped around the two large insulated conductors 205 and 207, the central strength member 209 and the single buffer tube 211 in a second wrapping direction, opposite to the first wrapping direction.

The first and third groupings 223A and 223C of textile strength elements cross over the second and fourth groupings 223B and 223D of textile strength elements to hold the two large insulated conductors 205 and 207, the central strength member 209 and the single buffer tube 211 together during assembly of the hybrid cable 201, so that the water-blocking tape 215 may be wrapped there around to form the core 203.

In a preferred embodiment, the first and second pluralities of textile strength elements 221 and 223 are formed of flaccid threads, like aramid fibers, sold under the trademark KELVAR. In a preferred embodiment, the hybrid cable 201 may also include first and second ripcords 225 and 227 located between the water-blocking tape 215 and the shielding layer 217. The first and second ripcords 225 and 227 assist in opening up an end of the hybrid cable 201 for a termination to connectors.

Figure 9:
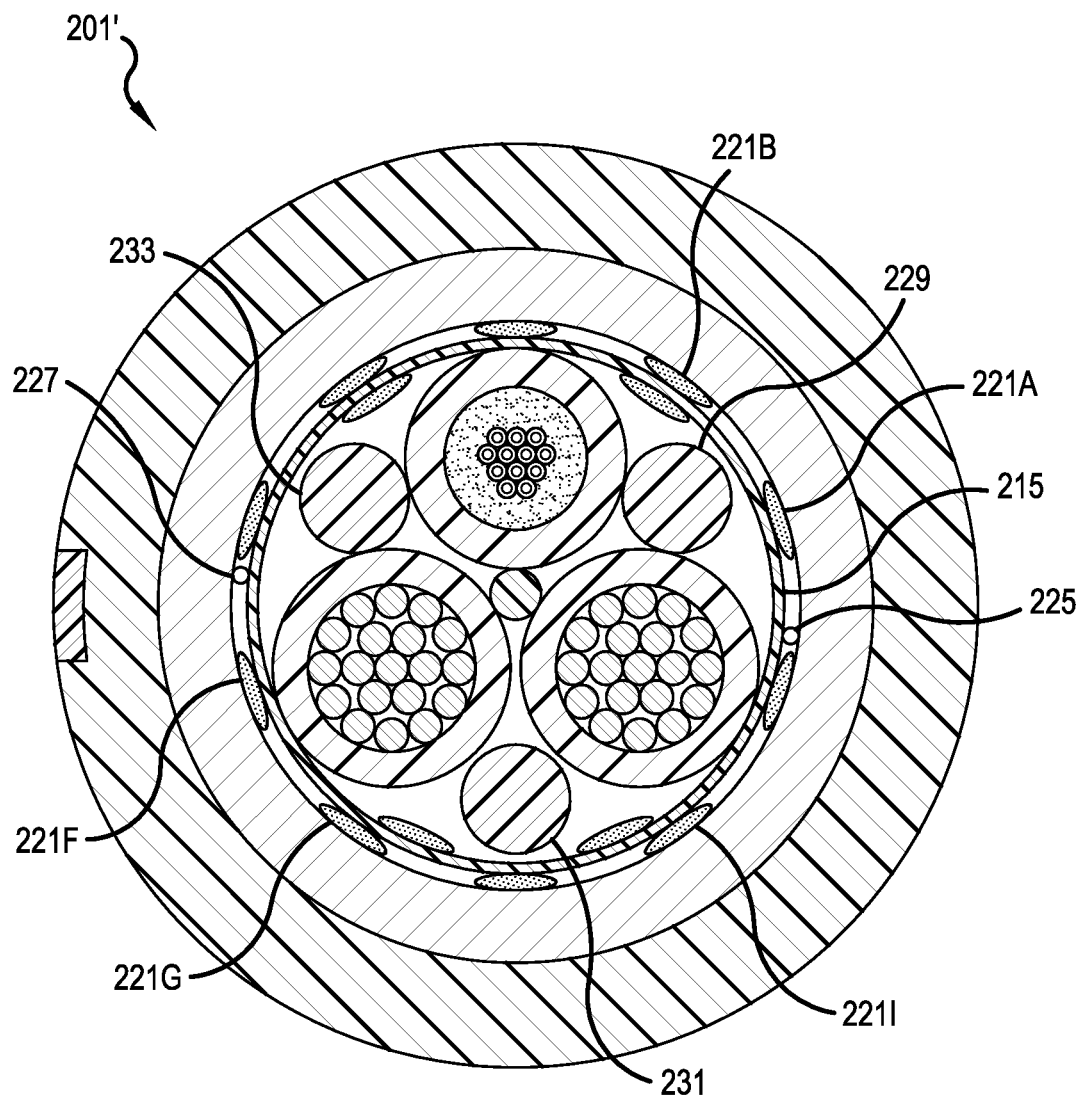
FIG. 9 is a cross sectional view, similar to FIG. 8, but illustrating alternative features for the hybrid cable of FIGS. 7 and 8.

In the embodiment of FIGS. 7 and 8, no filler rods are employed. FIG. 9 is a cross sectional view similar to FIG. 8 of a hybrid cable 201'. The hybrid cable 201' is an alternative to the hybrid cable 201. In FIG. 9, three filler rods 229, 231 and 233 are added to the core 203. Each of the three filler rods 229, 231 and 233 is not in abutment with the central strength member 209, but is in abutment with the inside surface of the water-blocking tape 215. The three filler rods 229, 231 and 233 cause the core 203 to assume a very circular outer profile, so that a circular outer profile is also achieved in the cross section of the overall hybrid cable 201'.

Figure 10:
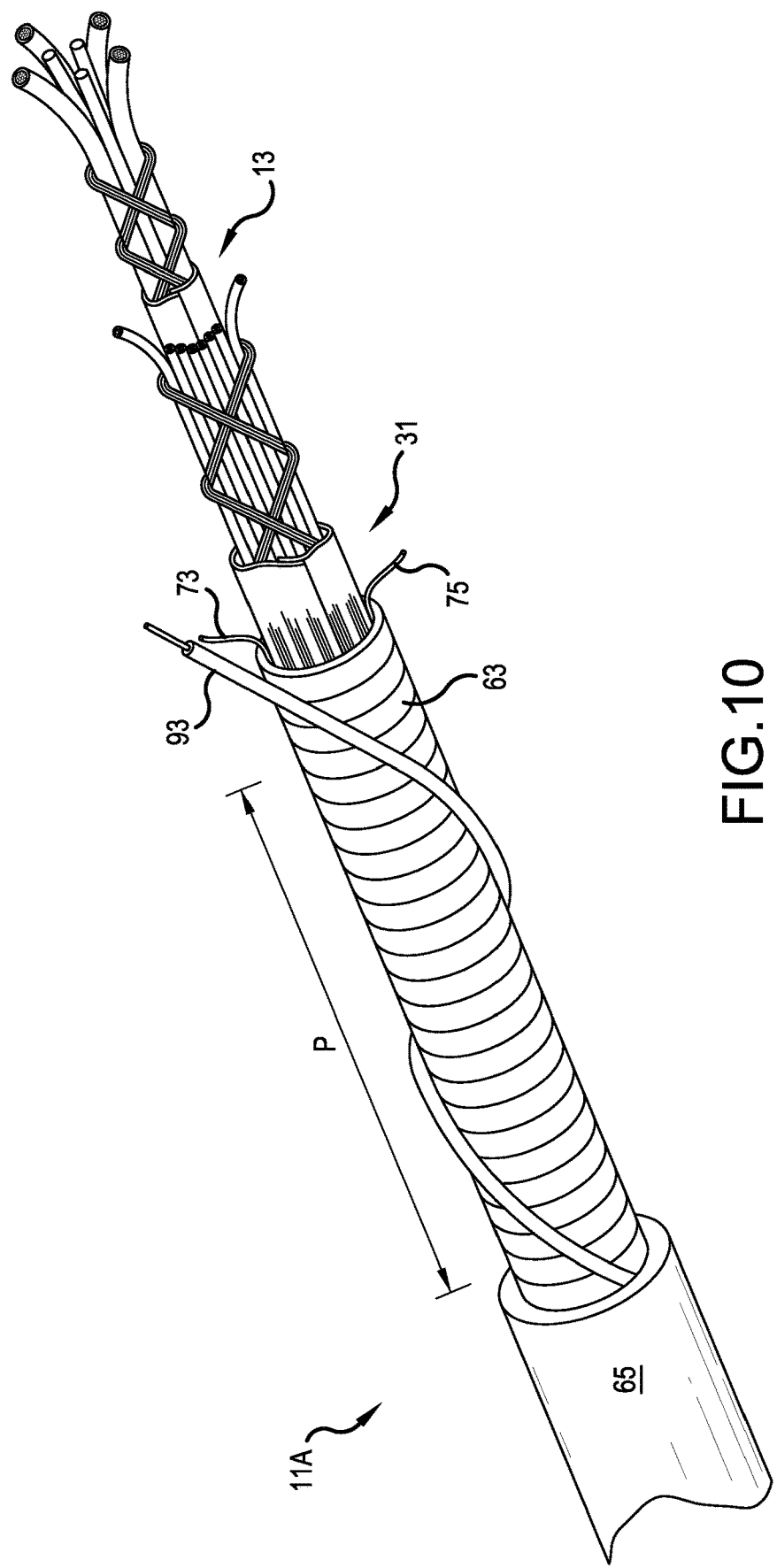
FIG. 10 is a front perspective view of the hybrid cable of FIGS. 1 and 2 with a first embodiment of a toning signal medium in conjunction therewith.

FIG. 10 is a front perspective view of a hybrid cable 11A. The hybrid cable 11A is the same as the hybrid cable 11 of FIGS. 1 and 2, but includes a first embodiment of a toning signal medium. The central core 13, concentric core 31 and the first, second and third pluralities of textile strength elements 67, 69 and 71 are the same as depicted in FIGS. 1 and 2. Therefore, the elements have not been separately labeled.

In FIG. 10, the toning signal medium takes the form of an insulated wire 93. The insulated wire 93 coils around the outer surface of the shielding layer 63 in a helical fashion. In a preferred embodiment, the pitch P of the helix is between six inches and twenty-four inches. Electrical isolation between the insulated wire 93 and the shielding layer 63 is maintained by at least the insulation layer on the insulated wire 93. Also, in the preferred embodiment, the gauge of the conductor within the insulated wire 93 is eighteen AWG. As the insulated wire 93 is present during the extrusion of the jacket 65 over the shielding layer 63, the thickness of the jacket 65 accommodates the diameter of the insulated wire 93, and permits the outer surface of the jacket 65 to remain approximately circular in cross section.

Figure 11:
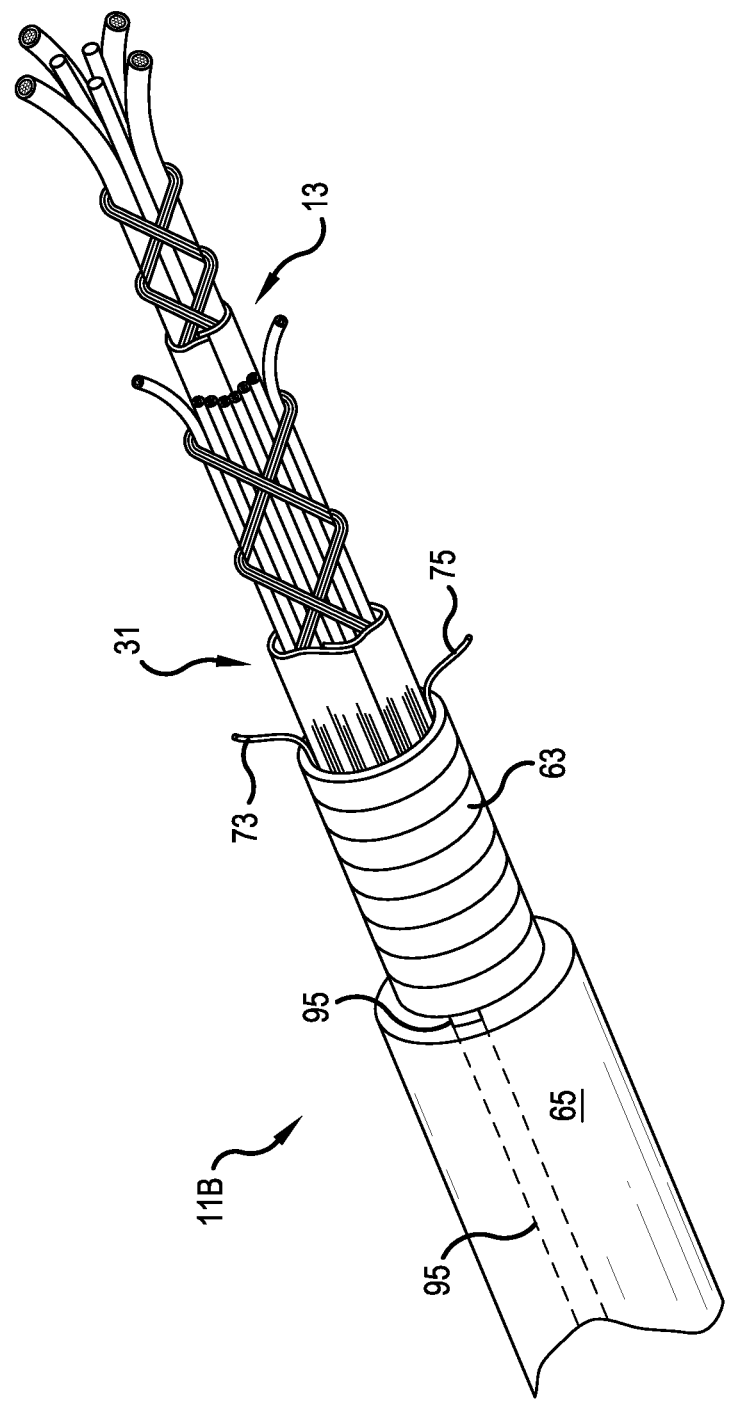
FIG. 11 is a front perspective view of the hybrid cable of FIGS. 1 and 2 with a second embodiment of a toning signal medium in conjunction therewith.

FIG. 11 is a front perspective view of a hybrid cable 11B. The hybrid cable 11B is the same as the hybrid cable 11 of FIGS. 1 and 2, but includes a second embodiment of a toning signal medium. The central core 13, concentric core 31 and the first, second and third pluralities of textile strength elements 67, 69 and 71 are the same as depicted in FIGS. 1 and 2. Therefore, the elements have not been separately labeled.

In FIG. 11, the toning signal medium takes the form of a conductive track 95. The conductive track 95 is a small inner portion of the jacket 65 which is highly doped with conductive segments, e.g., carbon fibers, copper mesh, conductive threads, etc. Due to the segmented structure of the conductive elements some flexibility is permitted without risking the breaking of the many conductive paths established throughout the conductive track 95. Electrical isolation between the conductive track 95 and the shielding layer 63 can be obtained by the formation of a coating or layer, e.g., MYLAR, on the outside surface the shielding layer 63.

Figure 12:
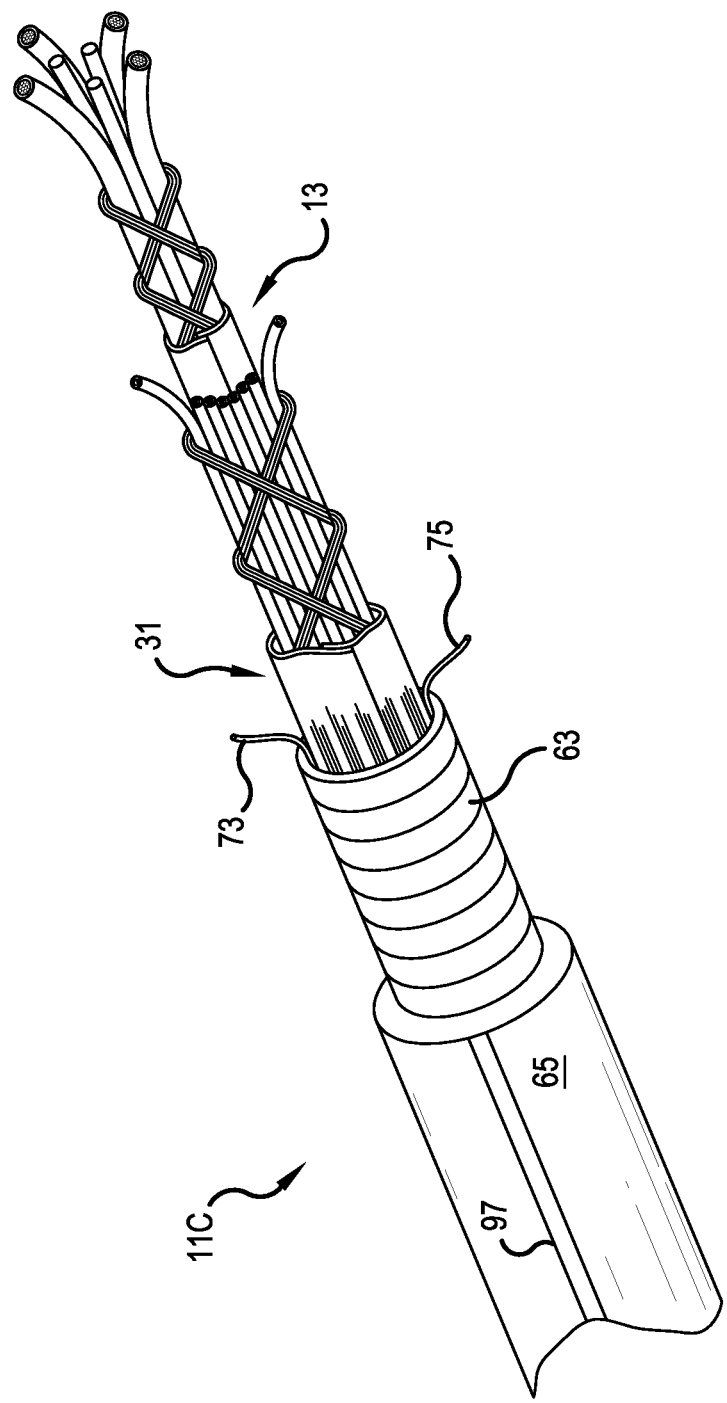
FIG. 12 is a front perspective view of the hybrid cable of FIGS. 1 and 2 with a third embodiment of a toning signal medium in conjunction therewith.

FIG. 12 is a front perspective view of a hybrid cable 11C. The hybrid cable 11C is the same as the hybrid cable 11 of FIGS. 1 and 2, but includes a third embodiment of a toning signal medium. The central core 13, concentric core 31 and the first, second and third pluralities of textile strength elements 67, 69 and 71 are the same as depicted in FIGS. 1 and 2. Therefore, the elements have not been separately labeled.

In FIG. 12, the toning signal medium takes the form of a conductive ink or elastic element 97. The conductive ink or elastic element 97 is a linear stripe of the outer surface of the jacket 65. Electrical isolation between the conductive ink or elastic element 97 and the shielding layer 63 is obtained by the intervening jacket 65.

Figure 13:
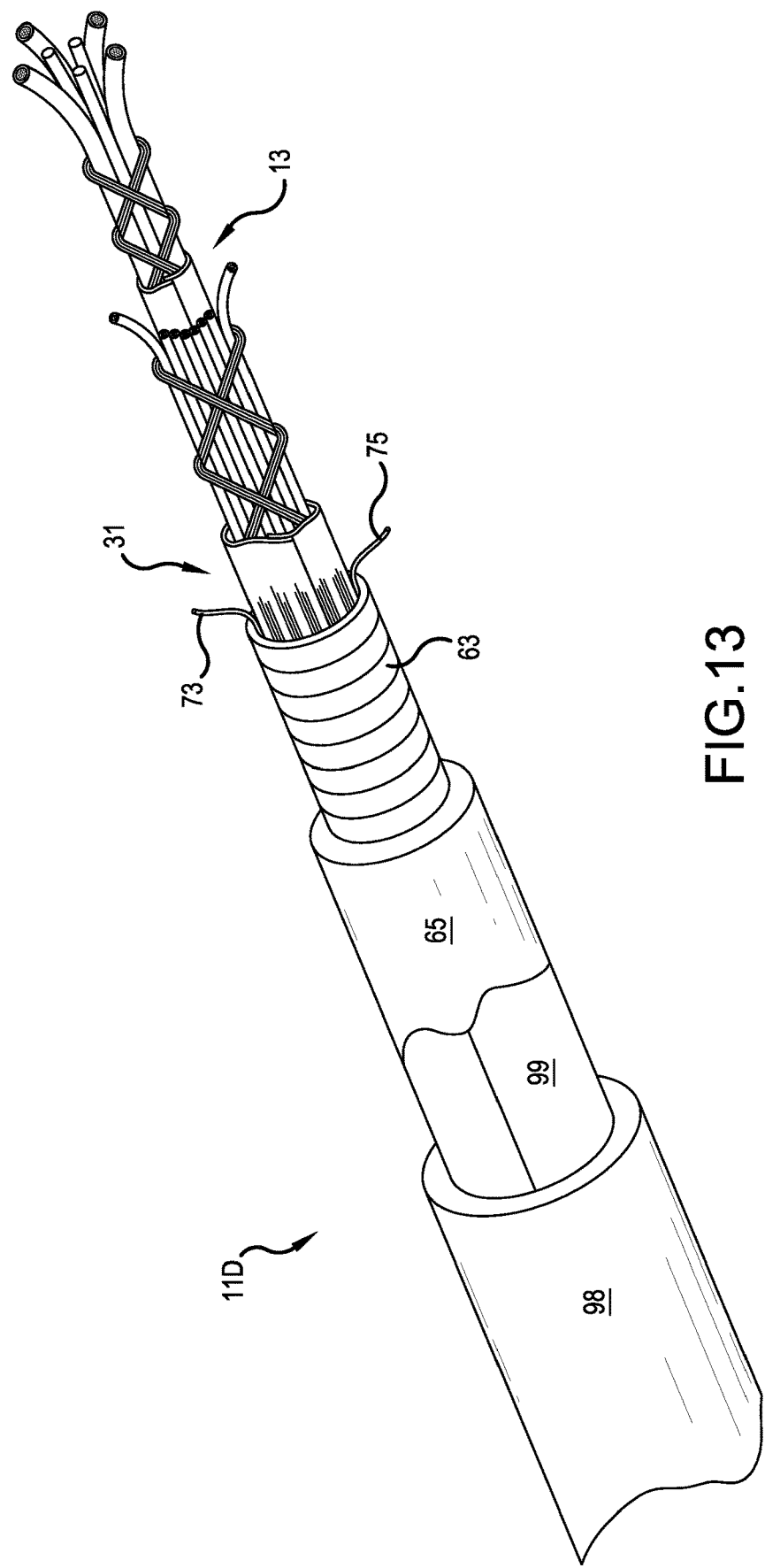
FIG. 13 is a front perspective view of the hybrid cable of FIGS. 1 and 2 with a fourth embodiment of a toning signal medium in conjunction therewith.

FIG. 13 is a front perspective view of a hybrid cable 11D. The hybrid cable 11D is the same as the hybrid cable 11 of FIGS. 1 and 2, but includes a fourth embodiment of a toning signal medium. The central core 13, concentric core 31 and the first, second and third pluralities of textile strength elements 67, 69 and 71 are the same as depicted in FIGS. 1 and 2. Therefore, the elements have not been separately labeled.

In FIG. 13, the toning signal medium takes the form of a conductive layer 99. The conductive layer 99 is similar to a shielding layer, and may be formed of a conductive foil and/or braided conductive wires, e.g., commonly used as a shielding layer of a coaxial cable. The conductive layer 99 is formed over the jacket 65, so that electrical isolation between the conductive layer 99 and the shielding layer 63 is obtained by the intervening jacket 65. An outer sleeve 98, which may be formed as an extruded outer jacket, may be applied over the conductive layer 99.

FIGS. 10-13 have shown the toning signal mediums 93, 95, 97 and 99 in combination with the hybrid cable 11 of FIGS. 1 and 2. However, the toning signal mediums 93, 95, 97 and 99 may also be used in combination with the hybrid cables 11', 101, 101', 201 and 201' of FIGS. 3-9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A hybrid cable comprising:
   an inner core including:
      four large insulated conductors, each formed by a large conductor wire surrounded by a dielectric layer, wherein each large conductor wire has a first American Wire Gauge (AWG) diameter,
      a central strength member, residing in a center of said inner core,
      a plurality of first filler rods, and
      a first water-blocking tape surrounding said four large insulated conductors, said central strength member and said plurality of first filler rods;

a concentric core surrounding said inner core, said concentric core including:
two small insulated conductors, each formed by a small conductor wire surrounded by a dielectric layer, wherein each small conductor wire has a second AWG diameter, which is smaller than the first AWG diameter, and
a plurality of buffer tubes, with each buffer tube including at least one optical fiber;
a shielding layer surrounding said concentric core; and
a jacket surrounding said shielding layer.

2. The hybrid cable of claim 1, wherein said four large insulated conductors are each in abutment with said central strength member.

3. The hybrid cable of claim 2, wherein said plurality of first filler rods consists of eight total filler rods, consisting of two larger filler rods, each approximately equal in diameter to one of said four larger insulated conductors, with each of said two larger filler rods being in abutment with said central strength member, and six smaller filler rods which are not in abutment with said central strength member, but which do abut said first water-blocking tape.

4. The hybrid cable of claim 1, wherein said plurality of first filler rods consists of two total filler rods, wherein said two total filler rods are each approximately equal in diameter to one of said four larger insulated conductors, with each of said two total filler rods being in abutment with said central strength member.

5. The hybrid cable of claim 1, wherein said four large, insulated conductors each include a twelve American Wire Gauge (AWG) conductor, and wherein said two small insulated conductors each include an eighteen AWG conductor.

6. The hybrid cable of claim 1, wherein said central strength member is a reinforced plastic rod.

7. The hybrid cable of claim 6, wherein said shielding layer is formed by corrugated aluminum.

8. The hybrid cable of claim 7, wherein said plurality of buffer tubes includes twelve buffer tubes, each with twelve optical fibers, making a fiber count of said hybrid cable 144 fibers.

9. The hybrid cable of claim 1, further comprising:
a second water-blocking tape surrounding said two small insulated conductors and said plurality of buffer tubes; and
a first plurality of textile strength elements located between said second water-blocking tape and said shielding layer.

10. The hybrid cable of claim 9, wherein said textile strength elements are aramid fibers, and further comprising:
at least one ripcord located between said second water-blocking tape and said shielding layer.

11. The hybrid cable of claim 9, further comprising:
a second plurality of textile strength elements located between said first water-blocking tape and said four large insulated conductors, said central strength member and said plurality of first filler rods, wherein said second plurality of textile strength elements includes a first grouping of textile strength elements helically wrapped around said four large insulated conductors, said central strength member and said plurality of first filler rods in a first wrapping direction, and a second grouping of textile strength elements helically wrapped around said four large insulated conductors, said central strength member and said plurality of first filler rods in a second wrapping direction, opposite to said first wrapping direction; and
a third plurality of textile strength elements located between said second water-blocking tape and said two small insulated conductors and said plurality of buffer tubes, wherein said third plurality of textile strength elements includes a third grouping of textile strength elements helically wrapped around said two small insulated conductors and said plurality of buffer tubes in a first wrapping direction, and a fourth grouping of textile strength elements helically wrapped around said two small insulated conductors and said plurality of buffer tubes in a second wrapping direction, opposite to said first wrapping direction.

12. The hybrid cable of claim 1, further comprising:
a toning signal medium disposed on an outer side of said shielding layer opposite to an inner side of said shielding layer facing said central strength member, wherein said toning signal medium is formed as an insulated wire coiling around said outer surface of said shielding layer in a helix fashion, with said jacket covering said insulated wire.

13. The hybrid cable of claim 1, further comprising:
a toning signal medium disposed on an outer side of said shielding layer opposite to an inner side of said shielding layer facing said central strength member, wherein said toning signal medium is formed as a conductive track on an inner portion of said jacket, which is highly doped with conductive segments.

14. The hybrid cable of claim 1, further comprising:
a toning signal medium disposed on an outer side of said shielding layer opposite to an inner side of said shielding layer facing said central strength member, wherein said toning signal medium is formed as a conductive ink or elastic element in the form of a linear stripe of an outer surface of said jacket, or is formed as a conductive layer formed over said jacket, and further comprising an outer sleeve applied over said conductive layer.

15. The hybrid cable of claim 2, wherein said plurality of first filler rods includes two larger filler rods, each approximately equal in diameter to one of said four larger insulated conductors, with each of said two larger filler rods being in abutment with said central strength member.

16. The hybrid cable of claim 1, wherein said plurality of buffer tubes includes eleven buffer tubes.

17. The hybrid cable of claim 1, wherein each buffer tube of said plurality of buffer tubes includes twelve optical fibers.

18. The hybrid cable of claim 1, wherein each small insulated conductor of said two small insulated conductors is approximately equal in diameter to each buffer tube of said plurality of buffer tubes.

19. The hybrid cable of claim 1, further comprising:
a second water-blocking tape surrounding said two small insulated conductors and said plurality of buffer tubes.

20. The hybrid cable of claim 1, wherein said large conductor wire is formed of stranded copper wire, and wherein said small conductor wire is formed of stranded copper wire.

* * * * *